Patented Dec. 26, 1944

2,365,808

UNITED STATES PATENT OFFICE 2,365,808

DIHALO ACIDS

James D. D'Ianni, Akron, Ohio, assignor to Wingfoot Corporation, Akron, Ohio, a corporation of Delaware No Drawing. Application May 10, 1941, Serial No. 392,943

5 Claims. (Cl. 260—539)

This invention relates to an improved method of preparing certain halogenated compounds. More particularly, it relates to the preparation of alpha, beta-dihaloaliphatic carboxylic acids, especially the dichloropropionic acids.

In the preparation of dihaloacids from the corresponding acrylonitrile, it is necessary to substitute two halogen atoms and also to hydrolyze the nitrile radical to a carboxylic acid group. Difficulty has heretofore been encountered in the direct chlorination of acrylonitrile to obtain the dichloropropionitrile because it was found that the reaction yielded, instead, the trichloropropionitrile and the beta-chloropropionitrile. In accordance with the terms of the present invention, it has been determined that, if the chlorination or other halogenation be conducted in an aqueous medium to which an acid is added, the chlorination proceeds to the stage where two halogen atoms are added to the molecule and, simultaneously, or immediately thereafter, the acid hydrolyzes the nitrile radical to the carboxyl group. Thus, an expeditious method is presented whereby dihalogenated aliphatic carboxylic acids can be readily obtained from the available nitriles. Indeed, the method may be employed to produce alpha, beta-dihaloaliphatic carboxylic acids from any aliphatic nitrile which is unsaturated in the alpha, beta position to the nitrile radical.

The method may be practiced by placing the unsaturated nitrile in an aqueous medium which has been acidified to the extent desired to hydrolyze the nitrile radical, heat being supplied to speed up the hydrolysis. The halogenation may, of course, be carried on at moderate temperatures but in such case hydrolysis is slow. Among the acids which may be employed are the hydrohalic acids, such as hydrochloric and hydrobromic acids, sulfuric acid, phosphoric acid, chloric acid, arsenic acid, and strong organic acids, such as chlor acetic acid. Concentrated acid is usually employed, 36% hydrochloric and 48% hydrobromic acids being suitable.

The method may be applied to the preparation of alpha, beta-dichloropropionic acid and alpha, beta-dibromo-propionic acid from acrylonitrile, dichloroisobutyric acid and dibromoisobutyric acid from methacrylonitrile and, similarly, the preparation of alpha, beta-dichloro, alpha-ethylpropionic acid, dichloroisovaleric acid, dichlorovaleric acid, and dichloro caproic acid, from the corresponding unsaturated nitriles. The dibromoacids and diodoacids corresponding to the aforementioned dichloroacids may be similarly prepared.

The following examples illustrate the process.

Example 1

Five mols (265 grams) of acrylonitrile were suspended in 750 cc. of concentrated hydrochloric acid (36%) and chlorine was then passed in as rapidly as it was absorbed. The temperature rose steadily and was maintained, by means of a cold water bath, at 50–60° C. during the main part of the reaction. When 5 mols of chlorine had been added, the mixture was heated to the reflux point for a period of 1–2 hours to complete the hydrolysis. Water and hydrochloric acid were removed at a pressure corresponding to 80° 100 mm./Hg. The voluminous precipitate of ammonium chloride was filtered from the residue and washed thoroughly with acetone. Fractionation gave 485 grams of crude dichloropropionic acid, B. P. 130–140°/40 mm.

Example 2

In 400 ml. of a 48% hydrobromic acid solution was dissolved 106 gram of acrylonitrile. Bromine was passed in with stirring, a cold water ice bath being used to maintain the temperature between 30 and 40° C. The reaction is rapid and exothermic. In approximately one hour a permanent bromine color was obtained, 90% of the theoretical amount of bromine having then been added. The solution was distilled under a pressure of 50–60 mm./Hg. until most of the water had been removed. The ammonium bromide resulting from the reaction was filtered off and washed with acetone. Filtrate and washings were then heated until the vapor temperature reached 100° C. at 10 mm. The residue, 400 grams, corresponding to 86% yield, was crude dibromopropionic acid and was almost completely water-soluble. The amount of sodium bromide filtered off was 165 grams or 84% of the theoretical. The reactions involved are as follows:

$$CH_2=CH-CN + Br_2 \rightarrow CH_2Br-CHBr-CN$$
$$CH_2Br-CHBr-CN + 2H_2O \rightarrow$$
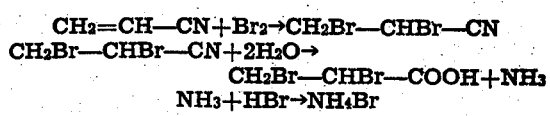
$$NH_3 + HBr \rightarrow NH_4Br$$

Example 3

To a solution of 88 ml. of concentrated sulfuric acid in 170 ml. of water was added 106 grams of acrylonitrile, the solution being cooled to 40° C. Chlorination was then conducted for a period of 6 hours at a temperature of 40°–50° C.; a gain in weight of 120 grams, or 84% of the theoretical, being recorded. The product, consisting of two layers, was refluxed for several hours to complete hydrolysis of the nitrile and was then distilled under a pressure of 50-60 mm. to remove water. The residue was thoroughly extracted with hot acetone. Fractionation of the extract gave 40 grams of dichloropropionic acid. A residue of alpha chloroacrylic acid polymer was also obtained.

*Example 4*

In a similar manner a mixture of 53 grams acrylonitrile, 100 ml. of 85% phosphoric acid and 25 ml. of water was chlorinated for a period of 6 hours, a gain in weight of 50 grams being noted. The chlorinated mixture was refluxed for 2 hours and then partially neutralized with 60 cc. of concentrated ammonium hydroxide. Distillation was conducted at 60-70 mm. pressure to remove water. The residue was thoroughly extracted with acetone and the extract fractionated to obtain 30 grams of dichloropropionic acid together with a residue which was largely alpha-chloroacrylic acid polymer.

The method described is valuable for the preparation of dihaloaliphatic carboxylic acids from the more available nitriles. In the case of alpha, beta-dihalopropionic acids and their alpha-alkyl substituted homologues, the method provides an important intermediate for the preparation of polymerizable monomers. Thus, removal of HCl from alpha, beta-dichloropropionic acid leaves alpha-chloroacrylic acid, this acid and its esters being easily polymerized. The method is further characterized by the employment of inexpensive starting materials, ease of operation and a high yield of the desired acid. These features combine to render the method much superior to the methods heretofore known for making such acids.

While there have been described above the preferred embodiments of the invention, it will be apparent to those skilled in the art that various modifications and changes may be made therein without departing from the spirit of the invention or from the scope of the appended claims.

I claim:

1. A method of preparing alpha, beta-dihaloaliphatic carboxylic acids which comprises halogenating a nitrile of the acrylic series in an acidic medium.

2. A method of preparing alpha, beta-dichloroaliphatic carboxylic acids which comprises chlorinating a nitrile of the acrylic series in an aqueous solution of hydrogen chloride.

3. A method of preparing alpha, beta-dichloropropionic acid which comprises chlorinating acrylonitrile in hydrochloric acid and then heating to complete the hydrolysis of the nitrile radical.

4. A method of preparing alpha, beta-dichloropropionic acid which comprises chlorinating acrylonitrile in concentrated hydrochloric acid and then heating to complete the hydrolysis of the nitrile radical.

5. A method of preparing alpha, beta-dichloropropionic acid which comprises chlorinating acrylonitrile added to hydrochloric acid of a concentration from about 15% to 35% and then heating to complete the hydrolysis of the nitrile radical.

JAMES D. D'IANNI.